(12) United States Patent
Wojciechowski et al.

(10) Patent No.: US 10,739,809 B2
(45) Date of Patent: Aug. 11, 2020

(54) PEDAL ASSEMBLY FOR A VEHICLE

(71) Applicant: GM GLOBAL TECHNOLOGY OPERATIONS LLC, Detroit, MI (US)

(72) Inventors: James Wojciechowski, Warren, MI (US); Tomasz R. Warzecha, Sterling Heights, MI (US); James A. Webster, Shelby Township, MI (US); Daniel D. Rodrigues, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 15/938,290

(22) Filed: Mar. 28, 2018

(65) Prior Publication Data

US 2019/0302827 A1    Oct. 3, 2019

(51) Int. Cl.
| | | |
|---|---|---|
| *G05G 1/40* | (2008.04) | |
| *B60K 26/02* | (2006.01) | |
| *B60T 7/06* | (2006.01) | |
| *B60W 30/182* | (2020.01) | |
| *G05D 1/02* | (2020.01) | |
| *G05G 1/405* | (2008.04) | |
| *B60R 21/09* | (2006.01) | |

(52) U.S. Cl.
CPC ............... *G05G 1/40* (2013.01); *B60K 26/02* (2013.01); *B60R 21/09* (2013.01); *B60T 7/06* (2013.01); *B60W 30/182* (2013.01); *G05D 1/0242* (2013.01); *G05D 1/0257* (2013.01); *G05D 1/0276* (2013.01); *G05G 1/405* (2013.01); *B60K 2026/024* (2013.01); *B60K 2026/026* (2013.01)

(58) Field of Classification Search
CPC . G05G 1/40; G05G 1/405; B60T 7/06; B60K 26/02; B60W 50/182; B60R 21/09
See application file for complete search history.

(56) References Cited

U.S. PATENT DOCUMENTS 6,182,525 B1 * 2/2001 Bowers ................. B60K 20/02
                                                      180/274
6,474,728 B1 * 11/2002 Mendis ................ B60K 23/00
                                                      296/190.08

(Continued)

FOREIGN PATENT DOCUMENTS

| DE | 19953002 A1 * | 12/2000 | ............. B60K 26/02 |
|---|---|---|---|
| DE | 102018206274 B3 * | 6/2019 | ............. B60K 26/02 |
| KR | 20170137427 A * | 12/2017 | |

*Primary Examiner* — Luis A Gonzalez

(57) ABSTRACT

An automotive vehicle includes a body having a passenger compartment and at least one pedal box for controlling vehicle acceleration or braking. The pedal box is movably coupled to an interior structural point disposed within the passenger compartment and movable between first and second positions with respect to the structural point. At least one pedal, actuatable by an occupant, is coupled to the pedal box. The vehicle additionally includes an actuator operably coupled to the pedal box and configured to selectively move the pedal box between the first position and the second position. The vehicle further includes at least one controller. The controller is configured to, in response to satisfaction of a first operating condition, control the actuator to move the pedal box to the first position, and, in response to satisfaction of a second operating condition, control the actuator to move the pedal box to the second position.

7 Claims, 7 Drawing Sheets

(56) References Cited

U.S. PATENT DOCUMENTS

| | | | |
|---|---|---|---|
| 6,662,677 B2* | 12/2003 | Rixon | B60T 7/06 |
| | | | 74/512 |
| 2001/0015111 A1* | 8/2001 | Rixon | G05G 1/38 |
| | | | 74/512 |
| 2006/0087154 A1* | 4/2006 | Schlafer | B60N 3/063 |
| | | | 296/190.01 |
| 2019/0118852 A1* | 4/2019 | Suzuki | B60K 26/02 |
| 2019/0176785 A1* | 6/2019 | Hansmann | B60T 13/741 |

* cited by examiner

PEDAL ASSEMBLY FOR A VEHICLE

TECHNICAL FIELD

The present disclosure relates to vehicles controlled by automated driving systems, particularly those configured to automatically control vehicle steering, acceleration, and braking during a drive cycle without human intervention.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

An automotive vehicle according to the present disclosure includes a body having a passenger compartment and at least one pedal box for controlling vehicle acceleration or braking. The pedal box is movably coupled to an interior structural point disposed within the passenger compartment. The pedal box is movable between a first position with respect to the structural point and a second position with respect to the structural point. The vehicle also includes at least one pedal, actuatable by an occupant, coupled to the pedal box. The vehicle additionally includes an actuator operably coupled to the pedal box and configured to selectively move the pedal box between the first position and the second position. The vehicle further includes at least one controller. The controller is configured to, in response to satisfaction of a first operating condition, control the actuator to move the pedal box to the first position, and, in response to satisfaction of a second operating condition, control the actuator to move the pedal box to the second position.

In an exemplary embodiment, the vehicle additionally includes an arcuate track fixedly coupled to the interior structural point, and the at least one pedal box is slidably coupled to the arcuate track. In such embodiments, the first position with respect to the structural point comprises a first position relative to the arcuate track, and the second position with respect to the structural point comprises a second position relative to the arcuate track.

In an exemplary embodiment, the vehicle additionally includes an axle fixedly coupled to the interior structural point, and the at least one pedal box is pivotably coupled to the axle. In such embodiments, the first position with respect to the structural point comprises a first angular position relative to the axle, and the second position with respect to the structural point comprises a second angular position relative to the axle.

In an exemplary embodiment, the vehicle additionally includes a pivotable interface having a first portion fixedly coupled to the interior structural point and a second portion being pivotable relative to the first portion, with the at least one pedal box being coupled to the second portion. In such embodiments, the first position with respect to the structural point comprises a first angular position relative to the first portion, and the second position with respect to the structural point comprises a second angular position relative to the first portion.

In an exemplary embodiment, the vehicle additionally includes an arcuate track fixedly coupled to the interior structural point and a pivotable interface having a first portion fixedly coupled to the interior structural point and a second portion being pivotable relative to the first portion. In such embodiments, the at least one pedal box comprises a first pedal box slidably coupled to the arcuate track and a second pedal box fixedly coupled to the second portion.

In an exemplary embodiment, the actuator comprises an electric motor.

In an exemplary embodiment, the first operating condition comprises an automated driving system controlling vehicle driving behavior, and the second operating condition comprises the automated driving system not controlling vehicle driving behavior.

A pedal assembly for a vehicle according to the present disclosure includes a pedal box with a mounting assembly supporting a pivot pin and a pedal pivotably coupled to the pivot pin. The pedal is actuatable by an occupant. The pedal assembly additionally includes an actuator coupled to the pedal box and configured to actuate the pedal box among a plurality of distinct positions. The plurality of distinct positions includes a deployed position and a stowed position. The actuator is configured to actuate the pedal box to the deployed position in response to a deploy command from a controller and to actuate the pedal box to the stowed position in response to a stow command from the controller.

In an exemplary embodiment, the controller is configured to generate the deploy command in response to satisfaction of a first operating condition and to generate the stow command in response to satisfaction of a second operating condition. The second operating condition may include an automated driving system controlling vehicle driving behavior, and the first operating condition may include the automated driving system not controlling vehicle driving behavior.

In an exemplary embodiment, the pedal box is movably coupled to an interior structural point of a vehicle passenger compartment, and the plurality of distinct positions includes a plurality of distinct positions of the pedal box relative to the interior structural point.

In an exemplary embodiment, the assembly additionally includes an arcuate track, with the pedal box being slidably coupled to the arcuate track. In such embodiments, the deployed position includes a first position relative to the arcuate track, and the stowed position includes a second position relative to the arcuate track.

In an exemplary embodiment, the assembly additionally includes an axle, with the pedal box being pivotably coupled to the axle. In such embodiments, the deployed position includes a first angular position relative to the axle, and the stowed position includes a second angular position relative to the axle.

In an exemplary embodiment, the assembly additionally includes a pivotable interface having a first portion and a second portion being pivotable relative to the first portion, with the pedal box being coupled to the second portion. In such embodiments, the deployed position includes a first angular position relative to the first portion, and the stowed position includes a second angular position relative to the first portion.

A method of controlling an automotive vehicle according to the present disclosure includes providing a vehicle with a first actuator configured to control vehicle acceleration or braking, a controller configured to selectively control the actuator in an autonomous mode according to an automated driving system, a pedal box having a mounting assembly supporting a pivot pin and a pedal pivotably coupled to the pivot pin, and a second actuator coupled to the pedal box and configured to actuate the pedal box among a plurality of distinct positions including a deployed position and a stowed position. The method additionally includes, in response to the controller controlling the first actuator in the autonomous mode, automatically controlling the second actuator, via the controller, to actuate the pedal box to the stowed position. The method further includes, in response to the controller not controlling the first actuator in the autonomous mode, automatically controlling the second actuator, via the controller, to actuate the pedal box to the deployed position.

Embodiments according to the present disclosure provide a number of advantages. For example, the present disclosure provides a system and method for providing control interfaces to a vehicle operator when useful, and moving such control interfaces out of the operator's way when unnecessarily, thereby avoiding unintentional control inputs and increasing occupant comfort.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
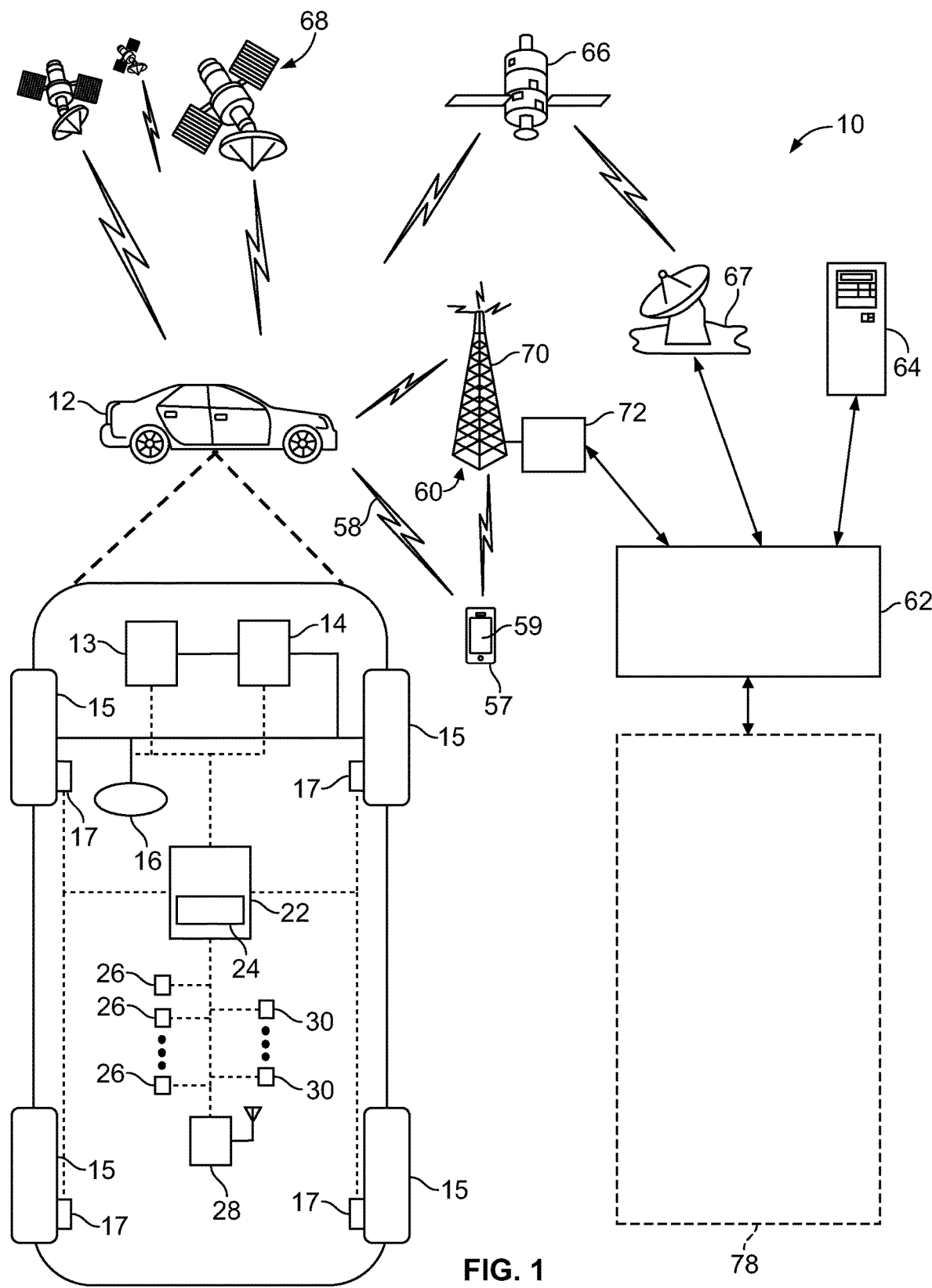
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a mobile device 57 such as a smart phone, and a remote access center 78.

The vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The vehicle 12 includes a propulsion system 13, which may in various embodiments include an internal combustion engine, an electric machine such as a traction motor, and/or a fuel cell propulsion system.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission.

The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 additionally includes at least one control pedal assembly 18. In an exemplary embodiment, the at least one control pedal assembly 18 includes a first pedal, which may be referred to as an accelerator pedal, for controlling the propulsion system 13 and a second pedal, which may be referred to as a brake pedal, for controlling the wheel brakes 17. The at least one pedal assembly 18 is provided in a pedal box. A pedal box refers to a pedal assembly comprising one or more pedal assembly 18, a pivot arm or pivot pin to which the pedal assembly 18 is pivotably coupled, and a mounting assembly or housing supporting the pivot pin and the pedal 18. The mounting assembly or housing may be coupled to a vehicle floor, interior panel, or other structural point positioned proximate a driver seat for access by an operator of the vehicle 12.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, wheel brakes 17, and pedal assembly 18 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the mobile device 57. The mobile device 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving GPS satellite signals and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12. The computer 64 may be in communication with at least one supplemental vehicle in addition to the vehicle 12. The vehicle 12 and any supplemental vehicles may be collectively referred to as a fleet.

Figure 2:
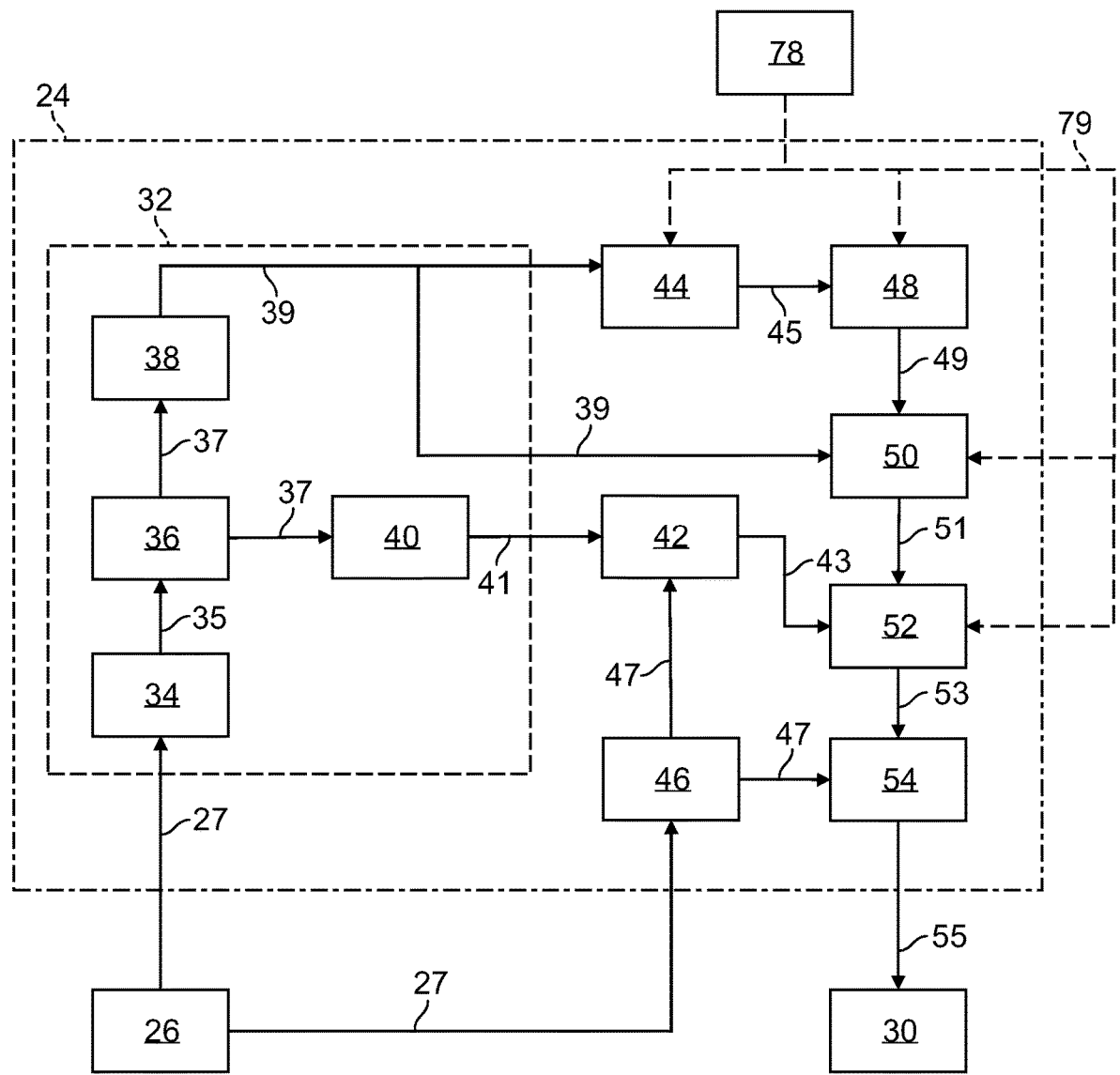
FIG. 2 is a schematic block diagram of an automated driving system (ADS) for a vehicle according to an embodiment of the present disclosure.
Figure 4:
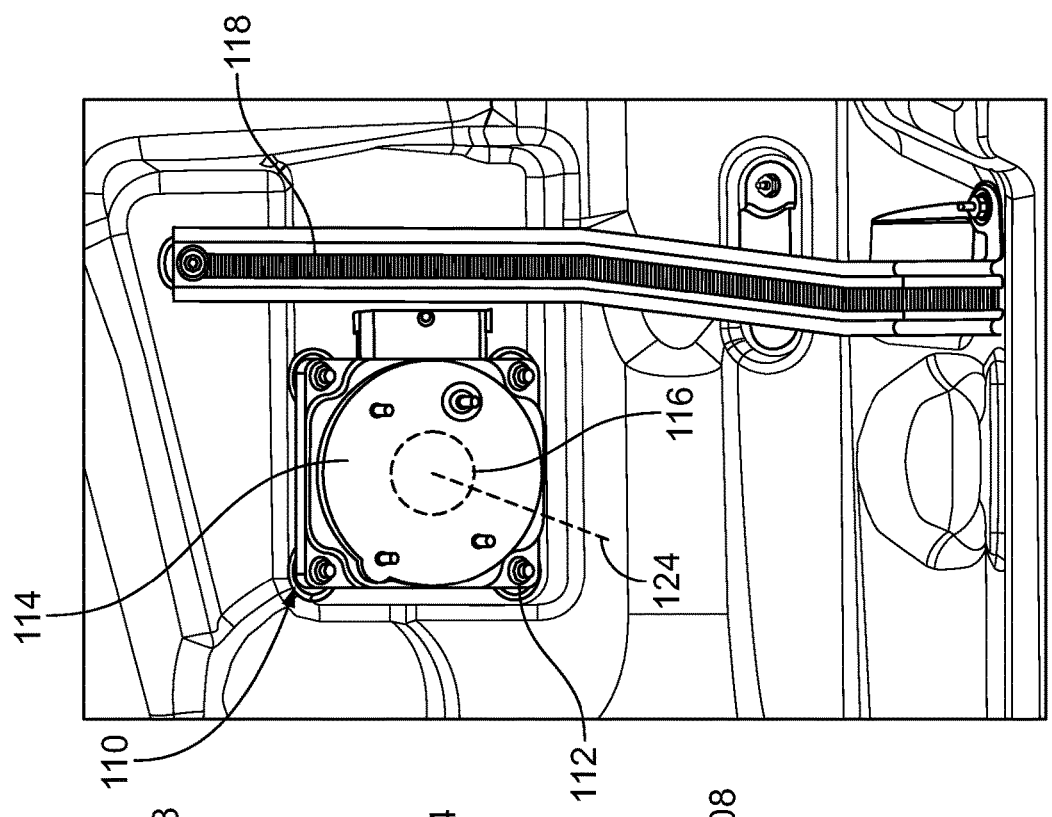
FIG. 4 is a partial view of the pedal assembly according to an embodiment of the present disclosure.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

In the illustrated embodiment, the vehicle 12 is a so-called dual mode vehicle, capable of being operated by a human driver or by the ADS 24. When the vehicle 12 is under the control of a human driver, control interfaces such as a steering wheel and the at least one pedal 18 should be accessible by the human driver. However, when the vehicle 12 is under the control of the ADS 24, human operation of such control interfaces may be unnecessary, undesirable, or both.

Referring now to FIGS. 3 through 6, a pedal assembly 100 according to an embodiment of the present disclosure is illustrated. The pedal assembly 100 includes a first pedal box 102 and a second pedal box 104. The first pedal box 102 has a first pedal arm 106 configured to pivot about a first pivot axis 107 when depressed by an operator. The second pedal box 104 has a second pedal arm 108 configured to pivot about a second pivot axis 109 when depressed by an operator. In the illustrated embodiment the first pedal arm 106 may be referred to as a brake pedal and the second pedal arm 108 may be referred to as an accelerator pedal.

The first pedal box 102 is mounted to a structural point of the vehicle 12 via a rotatable interface 110. In an exemplary embodiment, the structural point is disposed on or proximate a floor of the cabin of the vehicle 12. The rotatable interface 110 will now be described in further detail with respect to FIG. 4. The rotatable interface 110 includes a fixed portion 112, a rotatable portion 114, and a first actuator 116. The fixed portion 112 is coupled to the structural point of the vehicle. In the illustrated embodiment, the rotatable portion 114 comprises a generally disk-shaped member which may rotate within a track coupled to the fixed portion 112. The first actuator 116 is configured to rotate the rotatable portion 114 relative to the fixed portion 112 about an axis of rotation 124. In the illustrated embodiment the first actuator 116 comprises an electric motor coupled to a bottom portion of the rotatable portion 114. However, in other embodiments the first actuator 116 may take other forms, e.g. an electric motor coupled to a spur gear disposed at a periphery of the rotatable portion 114. In the illustrated embodiment, the axis of rotation 124 extends generally longitudinally, e.g. in a fore-aft direction of the vehicle 12. However, in other embodiments the rotatable interface 110 may be rotatable about other axes, as will be discussed in further detail below.

The second pedal box 104 is mounted to a structural point of the vehicle 12 via an arcuate track 118. A movable member 120 is coupled to the track 118, e.g. via sliding rails, and configured to move among a plurality of positions with respect to the track 118. A second actuator 122 is configured to move the movable member 120 among the plurality of positions. In the illustrated embodiment, the second actuator 122 comprises an electric motor coupled to the movable member 120 and provided with a pinion gear configured to interface with teeth on the track 118. However, in other embodiments the second actuator 122 and track 118 may take other forms, such as a belt or pulley system, or a chain and sprocket system.

The first actuator 116 and the second actuator 122 are both in communication with or under the control of the controller 22 and are configured to move the first pedal box 102 and the second pedal box 104, respectively, in response to commands from the controller 22.

Figure 3:
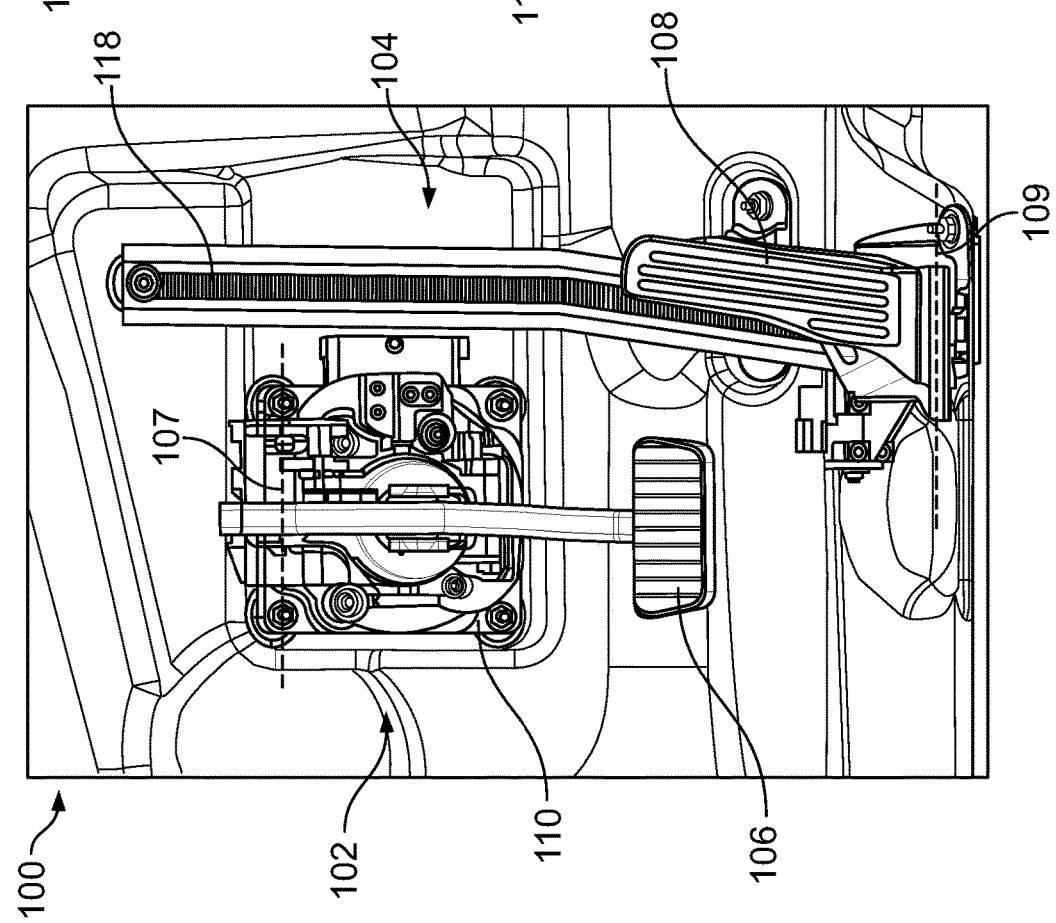
FIG. 3 is a first view of a pedal assembly according to an embodiment of the present disclosure.
Figure 5:
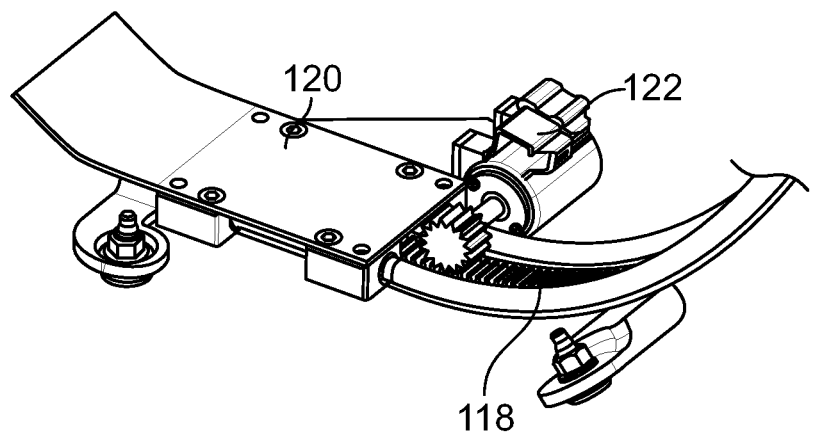
FIG. 5 is a detail view of a pedal box according to an embodiment of the present disclosure.
Figure 6:
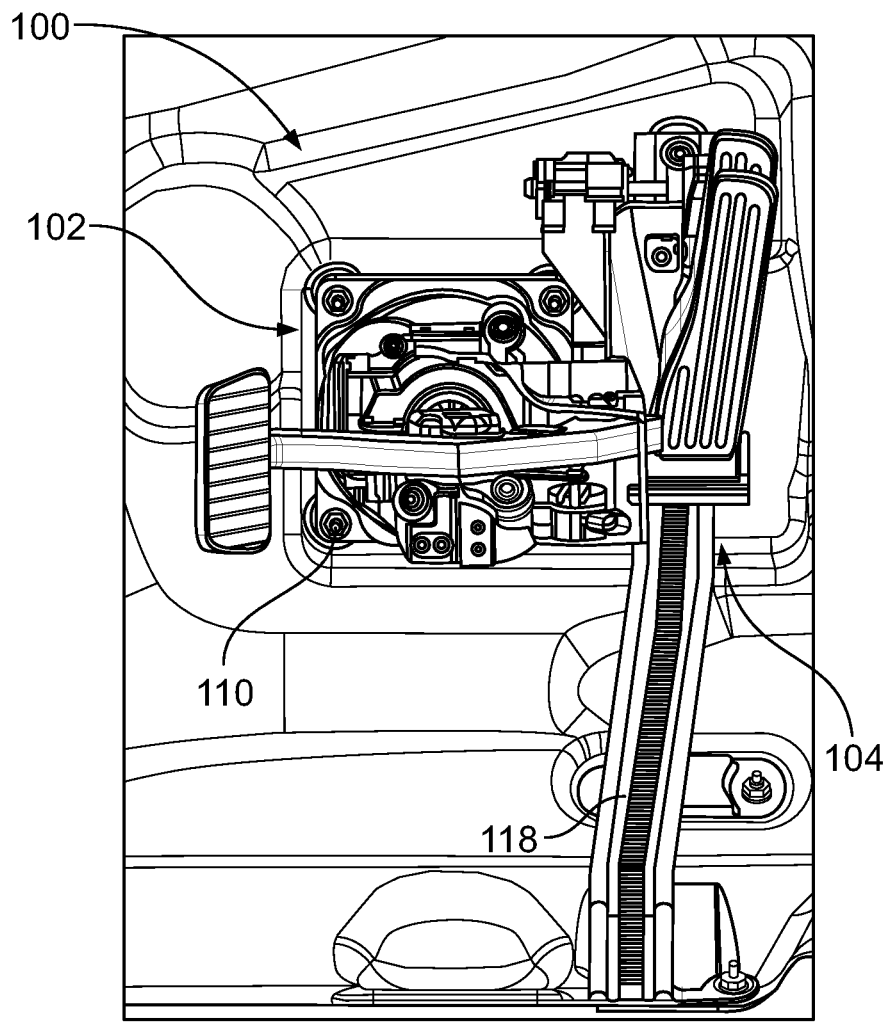
FIG. 6 is a second view of a pedal assembly according to an embodiment of the present disclosure.

In response to a stow command from the controller 22, the first actuator 116 and the second actuator 122 may move the first pedal box 102 and the second pedal box 104, respectively, from a deployed configuration, as illustrated in FIG. 3, to a stowed configuration, as illustrated in FIG. 6. In the illustrated embodiment, the first actuator 116 moves the first pedal box 102 to the stowed configuration by rotating the first pedal box 102 relative to the axis of rotation 124, and the second actuator 122 moves the second pedal box 104 to the stowed configuration by translating the second pedal box 104 relative to the track 118. Likewise, in response to a deploy command from the controller 22, the first actuator 116 and the second actuator 122 may move the first pedal box 102 and the second pedal box 104, respectively, from the deployed configuration to the stowed configuration, e.g. by reversing the above-described movements.

Figure 7:
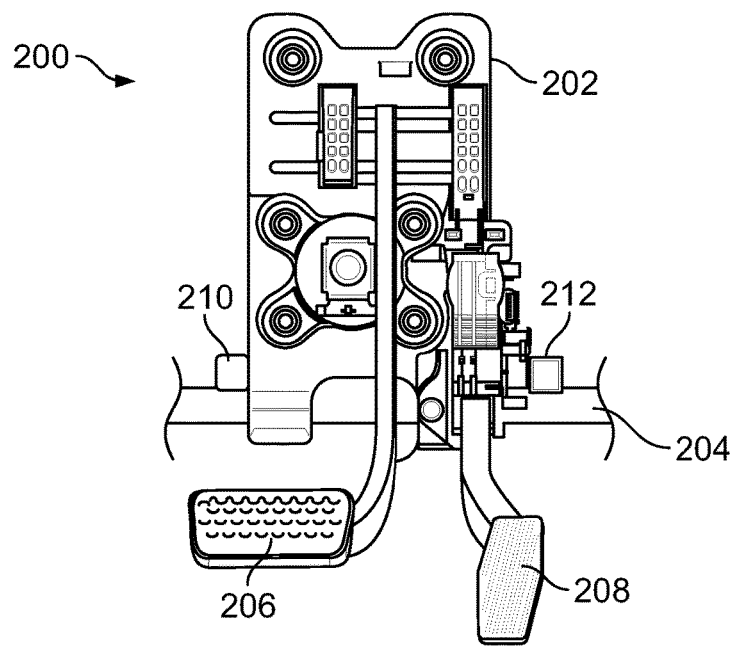
FIG. 7 is a front view of a pedal assembly according to a first alternative embodiment of the present disclosure.
Figure 8:
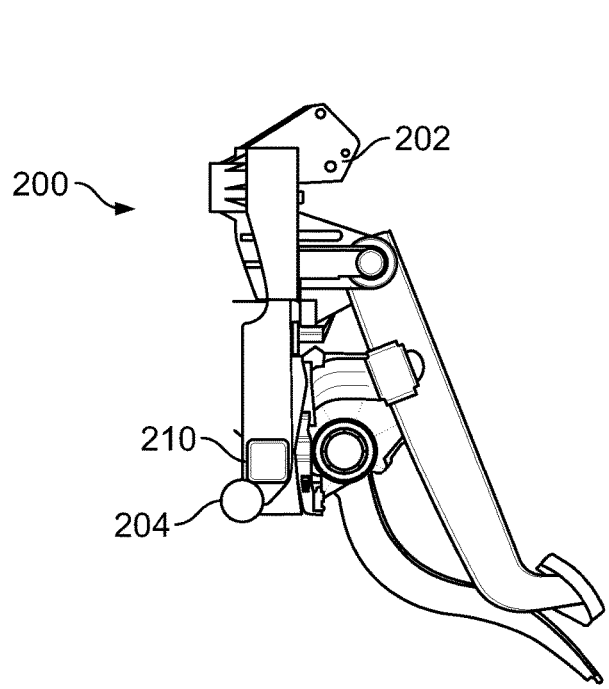
FIG. 8 is a first side view of the pedal assembly according to the first alternative embodiment of the present disclosure.
Figure 9:
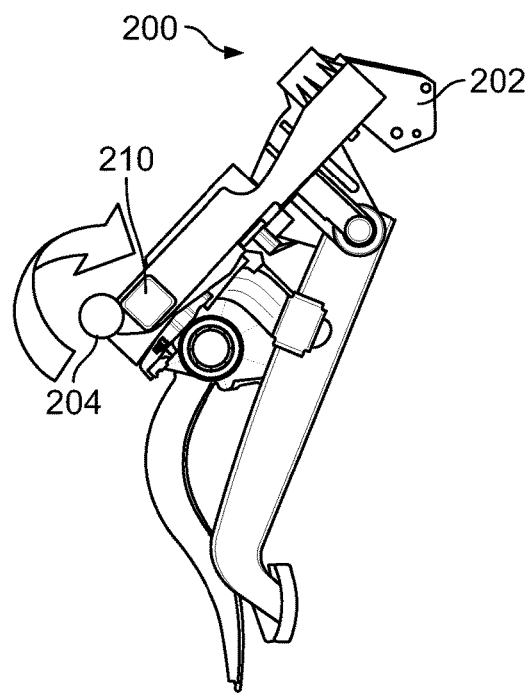
FIG. 9 is a second side view of the pedal assembly according to the first alternative embodiment of the present disclosure.

Referring now to FIGS. 7 through 9, a pedal assembly 200 according to a second embodiment of the present disclosure is illustrated. The pedal assembly 200 includes a pedal box 202 with a first pedal arm 206 and a second pedal arm 208. In the illustrated embodiment the first pedal arm 206 may be referred to as a brake pedal and the second pedal arm 208 may be referred to as an accelerator pedal.

The pedal box 202 is pivotably coupled to an axle 204, which is in turn coupled to an interior structural point of the vehicle. The axle has a central axis which extends generally parallel to the pivot axes of the first pedal arm 206 and the second pedal arm 208. The pedal box 202 is provided with an actuator 210 which is configured to pivot the pedal box 202 relative to the axle 204. In an exemplary embodiment, the actuator 210 comprises an electric motor coupled to a spur gear configured to interface with teeth provided about the periphery of the axle 204. However, other configurations are contemplated within the scope of the present disclosure. The pedal box 202 is also provided with a locking member 212, which may comprise a cam, pawl, or other similar feature configured to selectively retain the pedal box 202 in a desired orientation relative to the axle 204.

The actuator 210 is in communication with or under the control of the controller 22 and is configured to move the pedal box 202 in response to commands from the controller 22. In response to a stow command from the controller 22, the actuator 210 may move the pedal box 202 from a deployed configuration, as illustrated in FIG. 8, to a stowed configuration, as illustrated in FIG. 9. In the illustrated embodiment, the actuator 210 moves the pedal box 202 to the stowed configuration by pivoting the pedal box 202 relative to the axle 204. Likewise, in response to a deploy command from the controller 22, the actuator 210 may move the pedal box 202 from the stowed configuration to the deployed configuration, e.g. by reversing the above-described movements.

Figure 10:
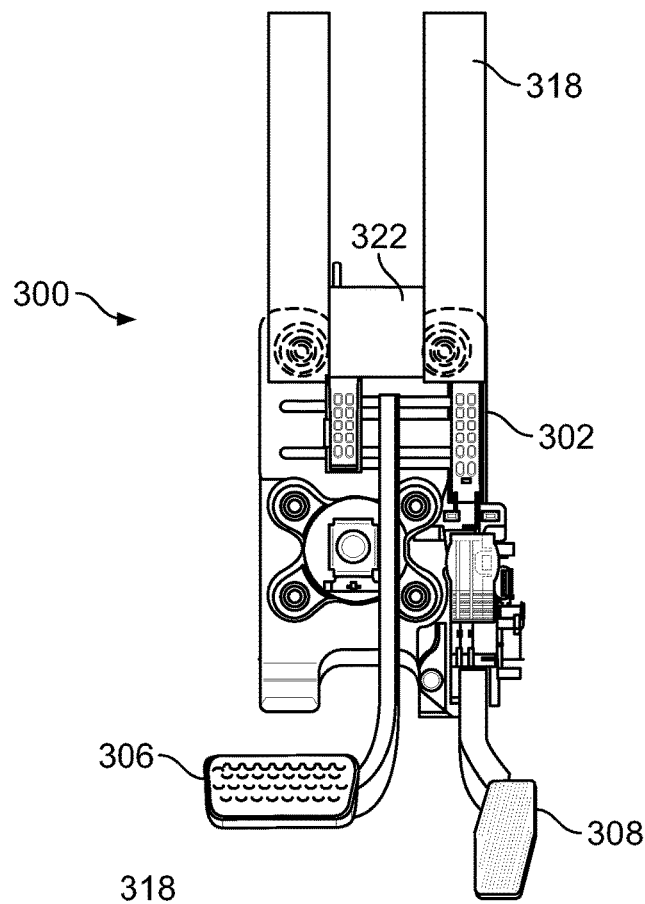
FIG. 10 is a front view of a pedal assembly according to a second alternative embodiment of the present disclosure.
Figure 11:
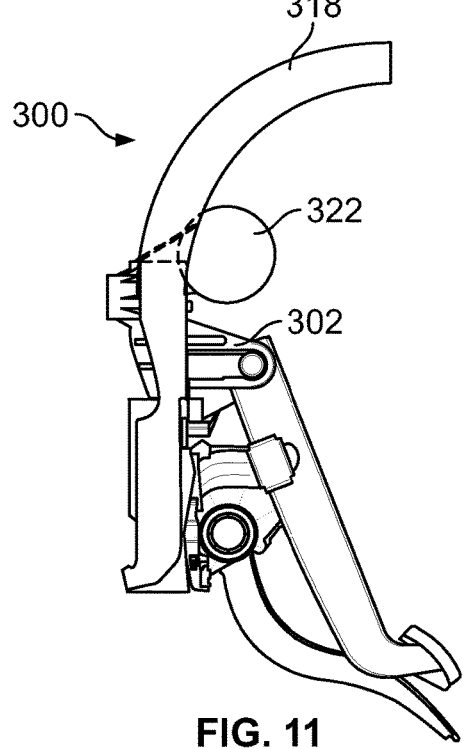
FIG. 11 is a first side view of the pedal assembly according to the second alternative embodiment of the present disclosure.
Figure 12:
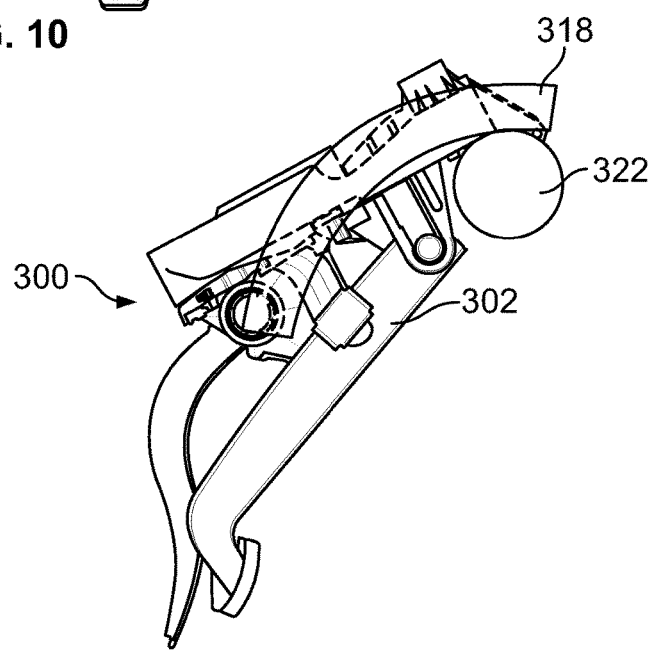
FIG. 12 is a second side view of the pedal assembly according to the second alternative embodiment of the present disclosure.

Referring now to FIGS. 10 through 12, a pedal assembly 300 according to a third embodiment of the present disclosure is illustrated. The pedal assembly 300 includes a pedal box 302 with a first pedal arm 306 and a second pedal arm 308. In the illustrated embodiment the first pedal arm 306 may be referred to as a brake pedal and the second pedal arm 308 may be referred to as an accelerator pedal.

The pedal box 302 is mounted to a structural point of the vehicle 12 via at least one arcuate track 318. The pedal box 302 is coupled to the track 318, e.g. via sliding rails, and is configured to move among a plurality of positions with respect to the track 318. An actuator 322 is configured to move the pedal box 302 among the plurality of positions. In an exemplary embodiment, the actuator 322 comprises an electric motor coupled to the pedal box 302 and provided with a pinion gear configured to interface with teeth on the track 318. However, in other embodiments the actuator 322 and track 318 may take other forms, such as a belt or pulley system or a chain and sprocket system.

The actuator 322 is in communication with or under the control of the controller 22 and is configured to move the pedal box 302 in response to commands from the controller 22. In response to a stow command from the controller 22, the actuator 322 may move the pedal box 312 from a deployed configuration, as illustrated in FIG. 11, to a stowed configuration, as illustrated in FIG. 12. In the illustrated embodiment, the actuator 322 moves the pedal box 302 to the stowed configuration by sliding the pedal box 302 relative to the track 318. Likewise, in response to a deploy command from the controller 22, the actuator 322 may move the pedal box 302 from the stowed configuration to the deployed configuration, e.g. by reversing the above-described movements.

Figure 13:
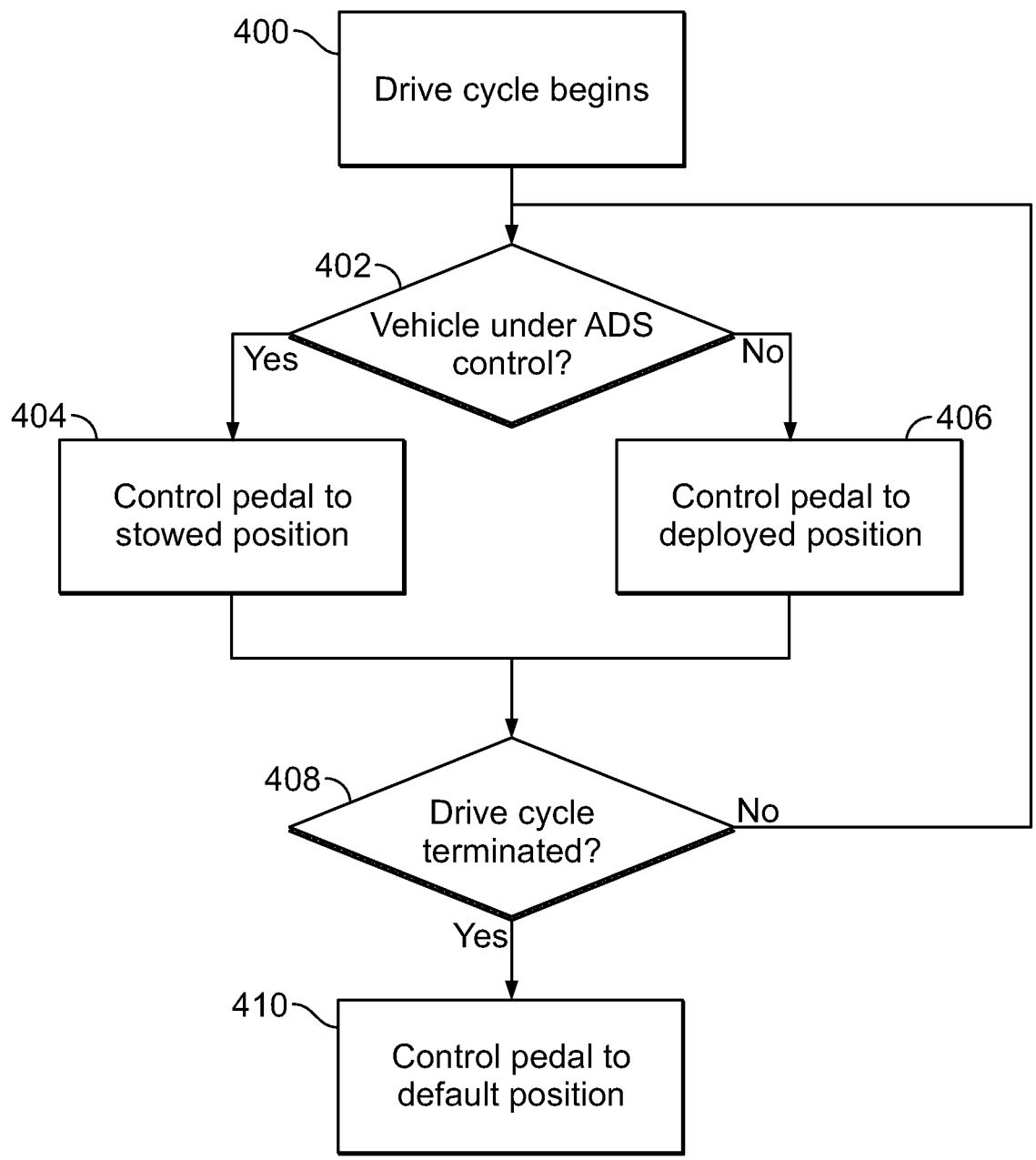
FIG. 13 is a flowchart representation of a method of controlling a vehicle according to an embodiment of the present disclosure.

Referring now to FIG. 13, a method of controlling an automotive vehicle is illustrated in flowchart form.

A vehicle drive cycle begins, as illustrated at block 400.

A determination is made of whether the vehicle is under control of the ADS 24, as illustrated at operation 402. In an exemplary embodiment, this determination is made by the controller 22.

If the determination of operation 402 is positive, i.e. the vehicle is under the control of the ADS 24, then the pedal assembly is controlled to a stowed position, as illustrated at block 404. This may be performed, for example, by the mechanisms and methods discussed above with respect to FIGS. 3 through 12.

If the determination of operation 402 is negative, i.e. the vehicle is not under the control of the ADS 24, then the pedal assembly is controlled to a deployed position, as illustrated at block 406. This may be performed, for example, by the mechanisms and methods discussed above with respect to FIGS. 3 through 12.

Subsequent either block 404 or block 406, a determination is made of whether the drive cycle has terminated, as illustrated at block 408. In an exemplary embodiment, this determination is made by the controller 22.

If the determination of operation 408 is negative, i.e. the drive cycle has not ended, then control returns to operation 402. The algorithm thus monitors ADS control of the vehicle and controls the pedal assembly accordingly unless and until the current drive cycle terminates.

If the determination of operation 408 is positive, i.e. the drive cycle has ended, then the pedal assembly is controlled to a default position, as illustrated at block 410. In an exemplary embodiment, the default position corresponds to the deployed position. However, in other embodiments the default position may correspond to the stowed position. The algorithm then terminates.

As may be seen the present disclosure provides a system and method for providing control interfaces to a vehicle operator when useful, and moving such control interfaces out of the operator's way when unnecessary, thereby avoiding unintentional control inputs and increasing occupant comfort.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
a body having a passenger compartment;
at least one pedal box for controlling vehicle acceleration or braking, the pedal box being movably coupled to an interior structural point disposed within the passenger compartment, the pedal box being movable between a first position with respect to the structural point and a second position with respect to the structural point;
at least one pedal, actuatable by an occupant, coupled to the pedal box;
an actuator operably coupled to the pedal box and configured to selectively move the pedal box between the first position and the second position; and
at least one controller configured to, in response to satisfaction of a first operating condition, control the actuator to move the pedal box to the first position, and, in response to satisfaction of a second operating condition, control the actuator to move the pedal box to the second position; and
an arcuate track fixedly coupled to the interior structural point and a pivotable interface having a first portion fixedly coupled to the interior structural point and a second portion being pivotable relative to the first portion, wherein the at least one pedal box comprises a first pedal box slidably coupled to the arcuate track and a second pedal box fixedly coupled to the second portion.

2. The automotive vehicle of claim 1, wherein the actuator comprises an electric motor.

3. The automotive vehicle of claim 1, wherein the first operating condition comprises an automated driving system controlling vehicle driving behavior, and wherein the second operating condition comprises the automated driving system not controlling vehicle driving behavior.

4. A pedal assembly for a vehicle, comprising:
   at least one pedal box having a mounting assembly supporting a pivot pin and a pedal pivotably coupled to the pivot pin, the pedal being actuatable by an occupant; and
   an actuator coupled to the pedal box and configured to actuate the pedal box among a plurality of distinct positions, the plurality of distinct positions including a deployed position and a stowed position, the actuator being configured to actuate the pedal box to the deployed position in response to a deploy command from a controller and to actuate the pedal box to the stowed position in response to a stow command from the controller; and
   an arcuate track and a pivotable interface having a first portion and a second portion being pivotable relative to the first portion, wherein the at least one pedal box comprises a first pedal box slidably coupled to the arcuate track and a second pedal box fixedly coupled to the second portion.

5. The pedal assembly of claim 4, wherein the controller is configured to generate the deploy command in response to satisfaction of a first operating condition and to generate the stow command in response to satisfaction of a second operating condition.

6. The pedal assembly of claim 5, wherein the second operating condition comprises an automated driving system controlling vehicle driving behavior, and wherein the first operating condition comprises the automated driving system not controlling vehicle driving behavior.

7. A method of controlling an automotive vehicle comprising:
   providing a vehicle with a first actuator configured to control vehicle acceleration or braking, a controller configured to selectively control the first actuator in an autonomous mode according to an automated driving system, at least one pedal box having a mounting assembly supporting a pivot pin and a pedal pivotably coupled to the pivot pin, an arcuate track fixedly coupled to the interior structural point of the vehicle, a pivotable interface having a first portion fixedly coupled to the interior structural point and a second portion being pivotable relative to the first portion, wherein the at least one pedal box comprises a first pedal box slidably coupled to the arcuate track and a second pedal box fixedly coupled to the second portion, and a second actuator coupled to the pedal box and configured to actuate the pedal box among a plurality of distinct positions including a deployed position and a stowed position;
   in response to the controller controlling the first actuator in the autonomous mode, automatically controlling the second actuator, via the controller, to actuate the pedal box to the stowed position; and
   in response to the controller not controlling the first actuator in the autonomous mode, automatically controlling the second actuator, via the controller, to actuate the pedal box to the deployed position.

\* \* \* \* \*